United States Patent
Pai et al.

(10) Patent No.: US 11,847,847 B2
(45) Date of Patent: Dec. 19, 2023

(54) LEARNING SYSTEM FOR CONVOLUTIONAL NEURAL NETWORKS TO IMPROVE ACCURACY OF OBJECT DETECTION IN NEW ENVIRONMENTS

(71) Applicant: Analog Devices International Unlimited Company, Limerick (IE)

(72) Inventors: Neeraj Pai, Bangalore (IN); Raka Singh, Bangalore (IN); Srinivas Prasad, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 329 days.

(21) Appl. No.: 17/214,578

(22) Filed: Mar. 26, 2021

(65) Prior Publication Data
US 2022/0309271 A1    Sep. 29, 2022

(51) Int. Cl.
| G06V 40/10 | (2022.01) |
| G06N 3/08 | (2023.01) |
| G06V 20/40 | (2022.01) |

(52) U.S. Cl.
CPC ............ *G06V 40/10* (2022.01); *G06N 3/08* (2013.01); *G06V 20/40* (2022.01)

(58) Field of Classification Search
CPC ...... G06V 40/10; G06V 20/40; G06V 10/454; G06V 10/82; G06V 20/52; G06N 3/08; G06N 3/0464; G06N 3/09; G06N 3/096
See application file for complete search history.

(56) References Cited

U.S. PATENT DOCUMENTS

| 10,318,827 | B2 | 6/2019 | Jia et al. |
| 2017/0169327 | A1 | 6/2017 | Nestler et al. |
| 2018/0330238 | A1* | 11/2018 | Luciw ................. G06V 10/454 |
| 2019/0228495 | A1* | 7/2019 | Tremblay ............... G06N 3/045 |
| 2022/0215201 | A1* | 7/2022 | Dwivedi ................ G06N 3/084 |

OTHER PUBLICATIONS

Nogueira, Jr. et al., RetailNet: A deep learning approach for people counting and hot spots detection in retail stores, *2019 32nd SIBGRAPI Conference on Graphics, Patterns and Images (SIBGRAPI)*, Rio de Janeiro, Brazil, 2019, pp. 155-162, doi: 10.1109/SIBGRAPI.2019.00029.

* cited by examiner

*Primary Examiner* — Fayyaz Alam
(74) *Attorney, Agent, or Firm* — ArentFox Schiff LLP (57) ABSTRACT

A method for fine-tuning a convolutional neural network (CNN) and a sensor system based on a CNN are disclosed. The sensor system may be deployed at a deployment location. The CNN may be fine-tuned for the deployment location using sensor data, e.g., images, captured by a sensor device of the sensor system at the deployment location. The sensor data may include objects that are not present in an initial data set used for training the CNN. The sensor data and the initial data set may be input to the CNN to train the CNN and obtain fine-tuned parameters of the CNN. The CNN can thus be fine-tuned to the deployment location of the sensor system, with an increased chance of recognizing objects when using the sensor system and the CNN to recognize objects in captured sensor data.

21 Claims, 6 Drawing Sheets

LEARNING SYSTEM FOR CONVOLUTIONAL NEURAL NETWORKS TO IMPROVE ACCURACY OF OBJECT DETECTION IN NEW ENVIRONMENTS

TECHNICAL FIELD OF THE DISCLOSURE

The present disclosure relates generally to sensor systems and methods for object detection, and in particular to sensor systems using convolutional neural networks (CNNs) for object detection.

BACKGROUND

A CNN is a class of deep learning neural networks, most commonly applied to analyzing visual imagery. They are also known as shift invariant or space invariant artificial neural networks (SIANN), based on their shared-weights architecture and translation invariance characteristics. A CNN can take an input data, e.g., an input image, assign importance (learnable weights and biases) to various aspects/objects in the image, and be able to differentiate one object from the other. The performance of deep neural networks for a typical object recognition application is highly influenced by the data used for training, which, in an object recognition case, typically includes images of the object in several different scenarios, lighting conditions, and in different sizes.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described herein are set forth below and the accompanying drawings.

Sensor systems are widely used to monitor the presence of objects, including persons, in different environments. Sensor systems may include image sensors for capturing images and/or video, sound sensors for capturing sounds, and/or any other sensor device for capturing information about objects and persons in the vicinity of the sensor device. Information captured by a sensor device is typically converted into digital data, enabling the information to be processed by computer systems. In the present disclosure, this digital data is called sensor data.

Sensor systems may be used for video surveillance purposes, where an image sensor, possibly together with a sound sensor, monitors the presence of objects or persons in an area. For example, a security system may use a sensor system to detect the presence of persons and determine whether the detected persons are authorized to be present in the area. In another example, persons may be detected in a room. Detecting persons in a room can be beneficial, e.g., to determine that all of a predetermined number of persons are present in a meeting. Another example where detecting persons in a room can be beneficial, is a scenario where lighting, heating and/or air conditioning systems may be controlled based on the presence of persons in the room. In another example, a sensor system may be used to determine that persons are obeying to a minimum distance between persons, e.g., as may be dictated by a government during the Covid-19 pandemic.

Sensor systems are typically configured to detect objects and/or distinguish objects from persons in the sensor data. To computer systems, persons are considered one of the detectable objects in the sensor data. CNNs may be used for object detection in sensor data.

A CNN is a computer implemented type of deep learning model for processing data that has a grid pattern, such as images, which is designed to automatically and adaptively learn spatial hierarchies of features, from low- to high-level patterns. CNN is a mathematical construct that is typically composed of three types of layers (or building blocks): convolution, pooling, and fully connected layers. The first two, convolution and pooling layers, perform feature extraction, whereas the third, the fully connected layer, maps the extracted features into final output, such as classification. A convolution layer is typically composed of a stack of mathematical operations, such as convolution, a linear operation. A pooling layer typically involves mathematical operations in the form of subsampling.

Deep neural networks, such as a CNN, typically include many layers, e.g., 22 layers in case of GoogLeNet™, 25 layers in case of VGGNet™-19 or 152 layers in case of ResNet™. A deep neural network includes one or more input layers, one or more output layers and intermediate layers called hidden layers. The hidden layers typically define the effectiveness of CNNs in many applications. The layers are stacked, i.e., the output of one layer is input to the next layer. The architectures or arrangement of layers with a large number of layers is called a 'deep' network.

In digital images, pixel values are typically stored in a two-dimensional grid, i.e., an array of numbers, and a small grid of parameters called kernel, an optimizable feature extractor, is applied at each image position, which makes CNNs highly efficient for image processing, since a feature may occur anywhere in the image. As one layer feeds its output into the next layer, extracted features can hierarchically and progressively become more complex.

The process of optimizing parameters of a CNN, such as kernels, weights and/or biases, is called training, which is performed so as to minimize the difference between outputs and ground truth labels through an optimization algorithm called backpropagation and gradient descent, among others.

The performance of deep neural networks for a typical object recognition application is highly influenced by the data used for training, which in an object recognition case typically includes images of the object in several different scenarios, lighting conditions, and in different sizes. Since deep networks typically include many, e.g., millions of independent parameters, a large number of inputs or images may be needed for training to determine the parameters. Typical data sets for training the neural network can include millions of images to expose the neural network to different conditions.

Ideally, a data set used for training includes images of all objects that may be present in sensor data. Such complete data set results in a high chance of detection of objects in the sensor data. Usually, standard data sets are used for training a CNN and there are many different environments where sensor systems may be deployed. It is likely that as least some of these different environments include objects that are unrecognizable by the CNN after being trained, because similar objects were not present in the standard data set used for training the CNN.

CNN based sensor systems may become less accurate with deployment in new environments, due to the limitation of available objects in standard data sets, which can result in objects being unrecognized by the sensor system. The present disclosure aims to tune the CNN of a sensor system to the new environment before or after deployment using fine-tuning training.

As will be appreciated by one skilled in the art, aspects of the present disclosure may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon.

The following detailed description presents various descriptions of specific certain embodiments. However, the innovations described herein can be embodied in a multitude of different ways, for example, as defined and covered by the claims and/or select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the present disclosure, when used to describe a range of dimensions or other characteristics (e.g., time, pressure, temperature, length, width, etc.) of an element, operations, and/or conditions, the phrase "between X and Y" represents a range that includes X and Y. If used, the terms "substantially," "approximately," "about," etc., may be used to generally refer to being within +/−20% of a target value, e.g., within +/−10% of a target value, based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" or notation "A/B/C" mean (A), (B), (C), (A and B), (A and C), (B and C), or (A, B, and C).

Other features and advantages of the disclosure will be apparent from the following description and the claims.

Example CNN

The following terms may be used in conjunction with CNNs. A 'parameter' stands for a variable that is automatically learned during the training process. A "kernel" refers to the sets of learnable parameters applied in convolution operations. A "weight" is generally used interchangeably with "parameter", but typically refers to a parameter outside of convolution layers, for example in fully connected layers. Weights are used to decide how much influence an input will have on an output. A "bias" is another learnable parameter. Biases are an additional input into the next layer and are not influenced by the previous layer.

A CNN may be stored and executed in a computing device in the form of a computer implemented model of the CNN and a data set of parameters that further defines the operation of the CNN.

Figure 1:
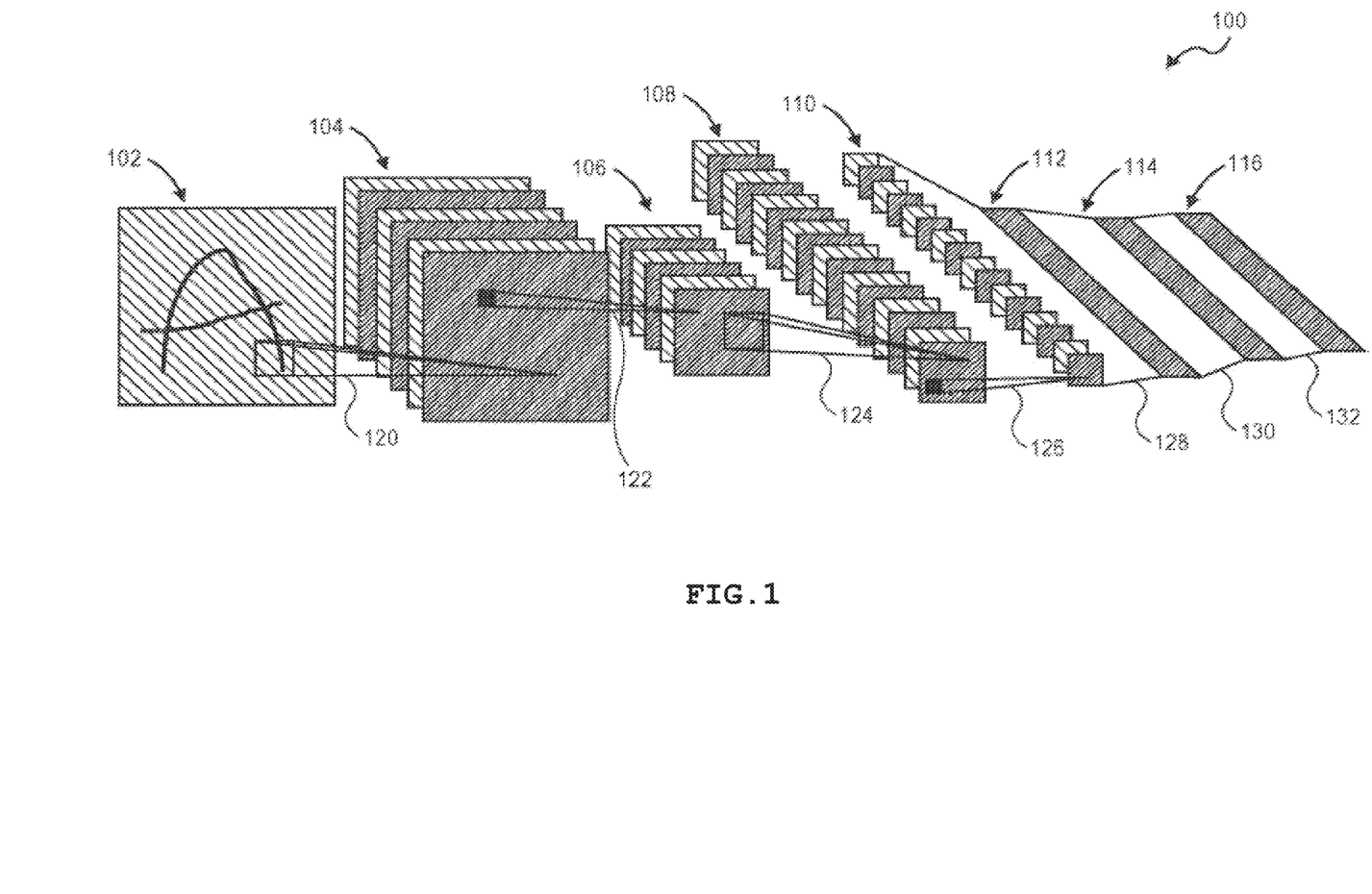
FIG. 1 is a diagram illustrating a CNN according to some embodiments of the present disclosure.

There are many different forms of CNN structures. FIG. 1 shows an illustrative embodiment of a block diagram for a deep neural network structure with seven layers. The layers may include convolution layers alternating with pooling layers.

Each layer in the CNN shown in FIG. 1 may include a convolution of an N×N sub-window of an input image pixel data 102. In the first layer 104 of FIG. 1, the sub-window may be 5×5 pixels with a stride of one. Thus, each sub-window may be shifted one pixel from the last sub-window as the image data is scanned and convolved 120. The sub-window can be overlapping or non-overlapping by choice of N and the stride value.

The second operation 122 in the second layer 106 may be a subsampling operation. It may be a 2×2 sub-window weighted mean followed by a nonlinear function, or squashing function, to generate the output data of each sub-window. The subsampling result may be a 14×14 array of processed pixel data when the subsampling uses a 2×2 window. The resulting subsampled data 106 may then be processed by a convolution operation 124 resulting in a third layer 108, which may be a convolution layer. The data from the third layer 108 may be subsampled 126 resulting in a fourth layer 110, which is a pooling layer. As shown in FIG. 1, there can be many layer pairs alternating between a convolution layer and a pooling layer. In FIG. 1, a full connection operation 128 on the fourth layer 110 results in a fifth layer 112, which may be a convolution layer. In one example, the fourth layer 110 is fully connected to the fifth layer 112 such that every output of the fourth layer 110 is connected to every input of the fifth layer 112. Each output of the fourth layer 110 can be connected to an input of the fifth layer via individual weights and nonlinear functions. Note that the individual weights are learned weights. Similarly, a full connection operation on the fifth layer 112 may result in the sixth layer 114. A Gaussian connection operation may be performed on the sixth layer 114 to yield the seventh layer 116, which, in this example, is the output.

In other implementations, the second operation may begin with the nonlinear function followed by a sub-window weighted mean. In other implementations, the nonlinear function may be part of the convolution layer, such that the output of the convolution layer is nonlinear.

In some embodiments, each convolution step may take a sub-window of the image data and weights each input to the convolution by a trainable and independent weight. In one example, there are 25 programmable weights used in each sum. The same weights may be used for every sub-window scan of the image data for each feature. Additionally, there may be a trainable bias weight added to the convolution sums.

A feature is an individual measurable property of the input data. For example, features may include edge detectors and color blob detectors. In other examples, features focus on finer details specific to the input data set and labels. In various applications, features can be numeric or structural. The neural network learns the features from the input data, and each layer of the neural network extracts some features from the input data. In some implementations, additional information may be provided to the neural network in the form of derived features from the data.

In FIG. 1, the convolution output from the first convolution operation 120 is shown as six features in the first layer 104. The number of features is application dependent. Each feature is an independent set of programmable weights for convolutional scans of the image data. The same weights are typically used for all convolution sums of the data of a particular feature and each feature is typically associated with a unique set of weights.

The input to a CNN typically goes through multiple layers. In some implementations, such as illustrated in FIG. 1, the input alternates between convolution layers (e.g., first 104, third 106, and fifth 112 layers) and pooling layers (e.g., second 106 and fourth 110 layers). In other implementations, the convolution and pooling layers may be in non-alternating order. For example, one implementation includes multiple consecutive convolution layers. Another implementation includes multiple consecutive pooling layers.

Subsampling, which is also known as pooling, reduces the complexity and spatial resolution of the image data, which reduces the sensitivity of the output to variation. Subsampling also reduces the size of the features by some factor. In one example, the reduction in feature size is accomplished by summing a group of M×M elements of the output of the previous convolution layer. In another example, the reduction in feature size is accomplished by averaging a group of M×M elements, and multiplying the average by a constant. There are a number of methods for subsampling. Subsampling may, e.g., determine a sum of M×M elements or determine a maximum of M×M elements. In some embodiments, a subsampling region can be overlapping with other subsampling regions. For example, in a 4×4 grid of numbers (which may be the output of a layer), using non-overlapping 2×2 regions for pooling results in a 2×2 output. In another example, in a 4×4 grid of numbers, using overlapping 2×2 regions for pooling results in a 3×3 output.

According to various implementations, CNN structures can have data passed through a nonlinear function after the convolution sum, after the subsampling, or after both the convolution sum and the subsampling for each layer. Examples of symmetric functions that can be used to process the CNN data include an erfc transfer function, a sigmoid function, and tan h functions. Additionally, the CNN data may be processed by a non-symmetric ReLU function, which is analogous to a rectifying function. In some implementations, the individual sums from a pooling layer may be passed through a squashing function before going to the next convolution layer. The squashing function can have a variety of shapes, and the shape of the squashing function can be symmetric or non-symmetric.

In the CNN diagram shown in FIG. 1, the first layer 104 (a convolution layer) and the second layer 106 (a pooling layer) have the same number of features. In particular, in FIG. 1, the first 104 and second 106 layers each have six features. The third layer 108 (a second convolution layer) has 16 features. The number of features is increased by adding several other mappings of the image pixels of the second layer 106 features to the features of the third layer 108. Thus, the number of features of the convolution and pooling layers can differ. The expansion of the number of features illustrates a break of symmetry in the network. Additionally, convolution and pooling layers can have different features. In particular, features can be transformed as the feature data moves from one layer to the next layer. According to some examples, the weights may be determined during a training phase and the weights may be saved after the training phase ends. In some examples, different features may be maintained in a convolution layer from the features maintained in a pooling layer.

In the convolution layer, the sum from a previous pooling layer is typically multiplied by a trainable weight. Additionally, a trainable bias may be added.

In a CNN implementation of a sensor system, parameters, such as weights of a layer, may be stored in a data storage or memory of the sensor system. For example, referring to FIG. 1, a CNN implementation may include independent programmable weights for the six features of the first layer 104 and individual weights for each element of the convolution sum. In the example of FIG. 1, this is 25 weights for each sum. In one example, there are 28×28=784 convolutions for each of the six features of the first layer 104, resulting in 784 sub-windows in the output array from the convolution operation 120 for each of the six features. Thus, in this example, the total number of convolutions in the first layer 104 is 6*28*28=4,704, and since there are 25 weights for each convolution, this results in 5*4,704=117,600 weighted sums that may be processed in the sensor system for the CNN of the sensor system.

A method that may be used for reducing the number of weighted sums is increasing the stride of the sub-windows. Increasing the stride of the sub-windows means moving the sub-windows by more than one pixel for each sub-window. For example, for a stride of two, the sub-window is moved two pixels horizontally and two pixels vertically, so the number of sub-windows is reduced by four and there are four times fewer total weighted sums.

Fine-Tuning a CNN of a Sensor System

Fine-tuning of a CNN is a process, wherein an initial data set and captured sensor data are input to the CNN to train the CNN for a specific deployment environment or deployment location. The initial data set may include a standard data set and is typically used for multiple CNNs of sensor systems deployed at different locations. The sensor data is typically captured at the location where the sensor system is or is to be deployed. The initial data set and sensor data together form an enriched data set for fine-tuning training of the CNN, which enriched data set includes objects from the deployment location on top of objects present in the standard data set.

The sensor data may be captured using the sensor device (or sensor devices if more are present) of the sensor system that includes the CNN to be fine-tuned. Alternatively, the sensor data may be captured using another, similar sensor device at the deployment location. The other, similar sensor device may be temporarily deployed at the location for this purpose, or may be an existing sensor device, possibly of another sensor system, installed at the deployment location.

The fine-tuning training may be performed prior to deployment of the sensor system to the deployment location. In this scenario, the sensor data may be collected at a location remote from the deployment location and the CNN of the sensor system may be trained at the remote location using an initial data set stored at the remote location and the collected sensor data. The remote location may be a computer system, server, cloud computing environment, or any other data processing system capable of training the CNN.

Alternatively, fine-tuning training may be performed after deployment of the sensor system to the deployment location. In this scenario, the CNN may be trained at the location remote from the deployment location using an initial data set. After deployment of the sensor system at the deployment location, the CNN may be fine-tuned using sensor data collected by the sensor system at the deployment location to further train the CNN. The fine-tuning after deployment may include a subset of the initial data set being input to the CNN together with the sensor data.

In some embodiments, fine-tuning involves only a few layers of the CNN. Limiting the number of layers to train may result in an optimization of the time required to fine-tune the CNN. Selectively tuning of a few layers while keeping the rest of the layers unchanged may be achieved by fixing the weights of the initial layers and modify only a few layers. This typically results in a reduction of the number of parameters and hence a smaller data set can be used to train or fine-tine the CNN.

In some embodiments, feature maps may be used instead of raw images for training. Using feature maps may resolve privacy issues by not providing raw images including details of a deployment location.

Example of Detecting Objects in a Room

Figure 2:
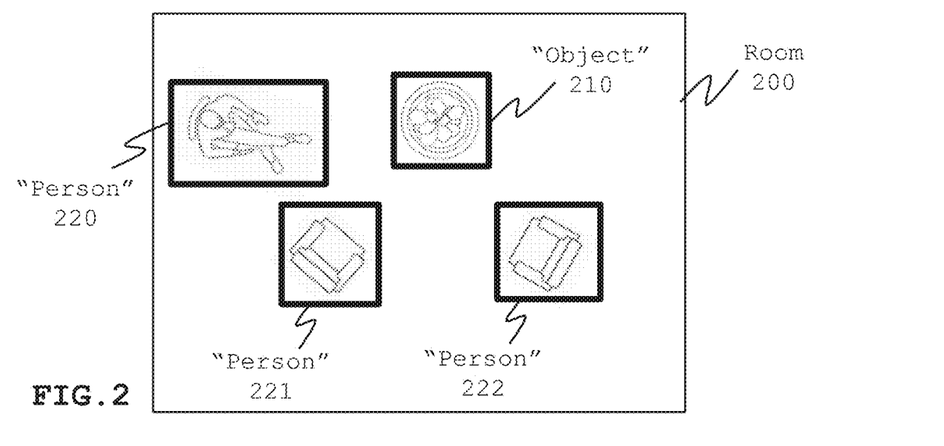
FIGS. 2-4 illustrate the effect of fine-tuning according to some embodiments of the present disclosure.
Figure 3:
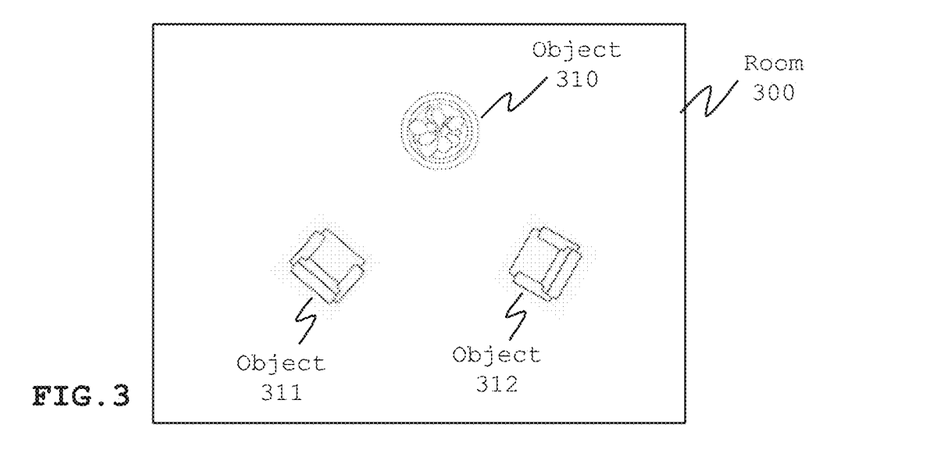
Figure 4:
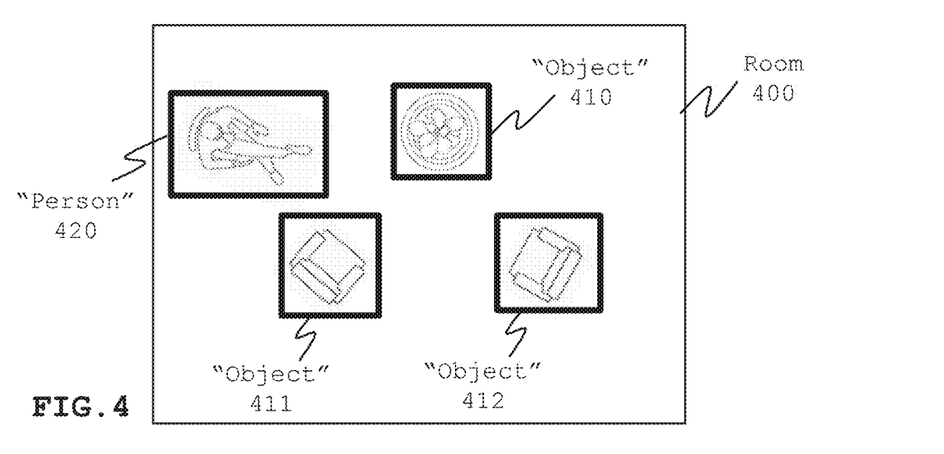

An example of the effect of fine-tuning is illustrated in the examples of FIGS. 2-4.

FIG. 2 shows an example of how a CNN based sensor system may detect objects at a deployment location without fine-tuning. In the example of FIG. 2, the sensor system is configured to distinguish persons from other objects, e.g., to count a number of persons present in the room. In this example, the sensor system includes a camera sensor installed at the ceiling of the room. A picture taken by the camera sensor results in a top view of the room 200, as shown in FIG. 2. The rectangular boxes depict objects and persons that have been identified by the sensor system. The labels in double quotes depict the identification result from the sensor system. In the example of FIG. 2, the sensor system concludes that one object 210 and three persons 220-222 are present in the room 200. One person 220 has been correctly identified, but persons 221 and 222 are false positives, i.e., incorrectly identified persons that are in fact objects. The false positives in FIG. 2 may be the result of training the CNN of the sensor system using the initial data set that include objects similar to object 210 and person 220, but lacking objects similar to objects 221 and 222.

FIG. 3 shows a top view of a room 300 including objects 310-312. In this example, room 300 is the same as room 200 and objects 310-312 are the same as present in room 200. One or more images of the room 300, i.e., images from the deployment location, may be input as sensor data to the CNN to fine-tune the CNN. This may result in the CNN being trained to recognize the objects 310-312. The sensor system may thus be trained to better distinguish persons from other objects at the deployment location.

FIG. 4 shows an example of how a CNN based sensor system may detect objects at a deployment location after fine-tuning. A picture taken by the camera sensor results in a top view of the room 400, as shown in FIG. 4. In this example, room 400 is the same as room 200. As in FIG. 2, the rectangular boxes depict objects and persons that have been identified by the sensor system. The labels in double quotes depict the identification result from the sensor system. In the example of FIG. 4, the sensor system correctly concludes that three objects 410-412 and one person 420 are present in the room 400. In the example of FIG. 4, there are no false positives.

For image detection scenarios, both the location of an object as well as accurately classifying that this is the object may be important. An incorrect detection of the location or incorrect classification may lead to an incorrect detection of an object. Known network architectures and image detectors may be used to address the problem of accurate object detection, e.g., RCNN (region CNN), faster RCNN, YOLO (you only look once), or SSD (single shot detector). Object detectors can be of a single stage or multi-stage.

A known method of image detector is the RCNN, which works in two stages. With RCNN, potential regions of images which may have the desired object may be identified (this is known as region proposals). Next, the regions are combined where possible. The detection and classification may be run on each of these identified regions.

Owing to running detection over multiple regions of an image one by one, latency is typically added to an RCNN process. Faster RCNN solves this problem by having a CNN identify the region proposals in a given image based on the features created that may have the object. With faster RCNN, the CNN feature output for each of the regions is passed to the detector and classification network. This avoids the potentially costly region identification stage, but owing to the two stages, faster RCNN is typically more time-consuming than single stage object detectors.

Popular single stage detection models like YOLO and SSD avoid the costly two stage approach by dividing an image into grids and running over the entire image at once to detect if there are any objects of focus in any of the grids. Templates are used based on aspect ratios of objects to help determine if two objects may lie in the same grid. Due to detecting across all regions at once, these networks can be several times faster compared to RCNN.

In some embodiments, the CNN of the present disclosure uses a single stage detector based on a modified ResNet™ architecture for object detection, but other detection networks may be used instead of ResNet™ when using a single stage detector.

Example of a Sensor System

Figure 5:
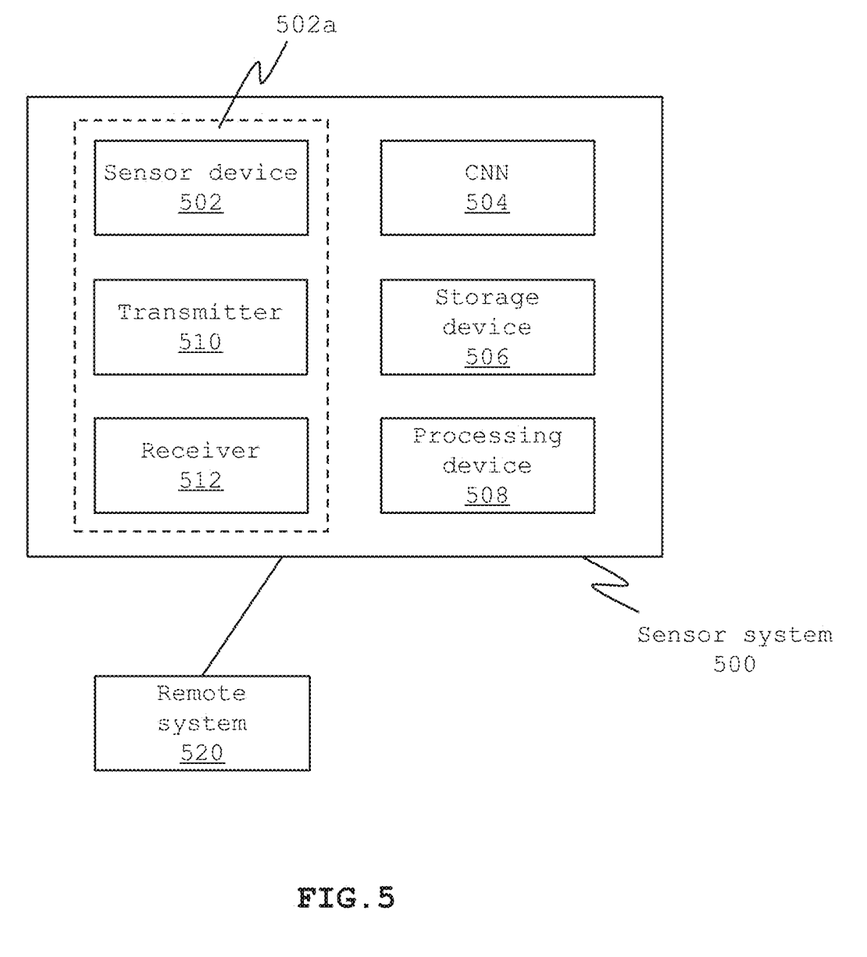
FIG. 5 is an illustrative block diagram of a sensor system according to some embodiments of the present disclosure.

FIG. 5 shows a system architecture of a sensors system 500, according to some embodiments. The sensor system 500 may include one or more sensor devices 502. In the examples of FIGS. 2-4, the sensor devices 502 include an image sensor for obtaining still image data or video data. The sensor system 502 may include any type of sensor device and is not limited to image sensors. The sensor system 502 may include one or multiple sensor devices. The type of sensor devices and the number of sensor device typically depends on the detection purposes of the sensor system 500.

An image sensor may be configured to capture images at different gains to simulate conditions related to different lighting conditions. The captured images at different gains may be added to the sensor data for fine-tuning the CNN.

The sensor system 500 may include a CNN 504. The CNN is typically implemented as a computer program that is configured to run a model of the CNN using trained parameters. The CNN may be configured to run in the sensor device 502. Alternatively, the CNN may be implemented to run in a memory of the sensor system 500.

The CNN 504 may include parameters that have been trained and/or fine-tuned using the initial data set and sensor data prior to deployment. Alternatively, the CNN 504 may include parameters that have been trained using the initial data set prior to deployment and fine-tuned after deployment. In another alternative, the CNN 504 may be trained and fine-tuned using the initial data set and sensor data after deployment. The latter alternative is less preferred because of the typically large data size of the initial data set, which would need to be transferred to the sensor system 500.

Initially configuring the CNN 504 by training using the initial data set without sensor data, allows the sensor system 500 to be deployed in an initial state that may be similar to other sensor systems deployed at different locations. After deployment, the sensor system 500 may be customized to the deployed location by fine-tuning the CNN 504 for the deployment location. In some embodiments, a factory reset of the sensor system 500 may result in the CNN resetting to the initial state, allowing the sensor system 500 to be fine-tuned again at the deployment location or at another location.

Different sensor systems 500 may include the same CNN 504, i.e., a CNN trained with the same initial data set and sensor data. This may be useful, e.g., when different sensor systems are deployed at the same deployment location or in similar deployment environments.

The sensor system 500 may further include a storage device 506, e.g., for storing sensor data captured by the sensor device 502, software code running on the sensor system 500, definitions of the CNN 504, and/or parameters of the CNN 504.

The sensor system 500 may further include one or more processing devices 508 for running the CNN and/or any other software code of the sensor system 500. The one or more processing devices may be configured to fine-tune the CNN 504.

The sensor system 500 may include a transmitter 510 and a receiver 512 for communication with a remote system 520. In some embodiments, the transmitter 510 and the receiver 512 may be integrated with the sensor device 502, indicated by the dashed box 502a in FIG. 5. Alternatively, or additionally, the transmitter 510 and the receiver 512 may be separate from the sensor device 502.

The remote system 520 may collect data from the sensor system 500. Alternatively, or additionally, the remote system 520 may store the initial data set and/or sensor data used to train the CNN 504. The sensor system 500 may be communicatively connected to different remote computer systems.

In some embodiments, the parameters of the CNN 504 may be uploaded to the remote system 520 for remotely fine-tuning the CNN. After fine-tuning the parameters of the CNN 504 may be download from the remote system 520 to the sensor system 504.

In some embodiments, privacy rules at the deployment location may mandate that the sensor system 500 cannot be connected to a Wi-Fi network to send images to a remote server 520 for training. In this example, it may be allowed that the sensor system 500 is connected to a near and limited network, such as Bluetooth™ Low Energy (BLE) during deployment. Without a connection to a remote system 520, the initial data set may be available from a device connected to the near and limited network.

In some embodiments, a sensor system 500 may be trained before deployment for a specified period of time using features. During this period the sensor system 500 may send features, e.g., parameters, extracted from a feature extraction layer of the CNN 504 to a remote system 520, e.g., a server, for training. The features may be compressed before sending to the server 520. Transmission of the data to the server 520 may use a low bandwidth network like ZigBee or Wi-Fi, or any other suitable network. The features may be used to train a detection head of the CNN model at the server 520. Using features for the training, it can be avoided that potentially privacy sensitive information in images is transmitted to the server 520, as features typically do not include image data. By limiting the training to the detection head, training time may be minimized. Training using features and detection head training may be used to train the CNN 504 and update CNN models dynamically.

Example Methods for Fine-Tuning a CNN of a Sensor System

Figure 6:
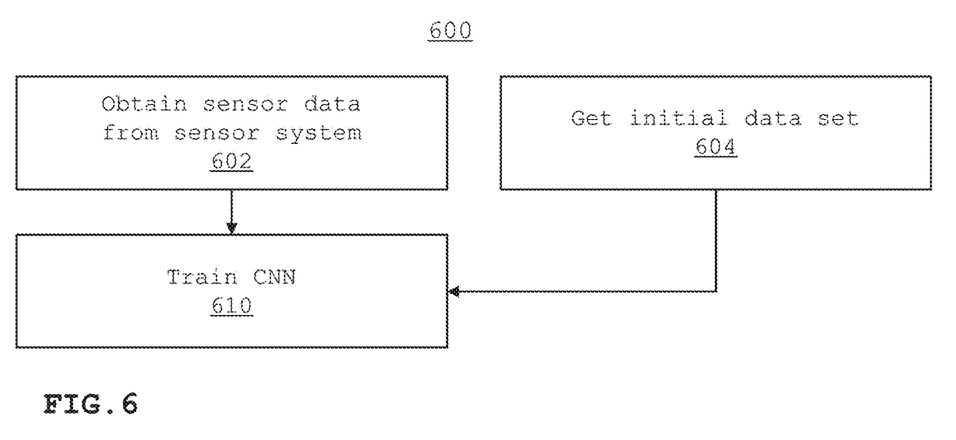
FIG. 6 is a flowchart of an example method for fine-tuning a CNN of a sensor system according to some embodiments of the present disclosure.

FIG. 6 is a flow diagram of an example method 600 for fine-tuning a CNN of a sensor system, e.g., CNN 504 of sensor system 500, according to some embodiments. In step 602 sensor data may be obtained from the sensor system, e.g., from a sensor device 502. This sensor data may be used to provide the sensor data for fine-tuning the CNN. In step 604 an initial data set is obtained, which may be used to provide the initial data set for fine-tuning the CNN. In step 610 the sensor data and the initial data set are used to train the CNN. The fine-tuning results in parameters that are fine-tuned to the deployment location of the sensor system, typically in the form of updated weights and/or biases of the CNN. The parameters obtained from the fine-tuning may be stored in the sensor system 500, e.g., in storage device 506 or any other data storage or memory device.

In some embodiments, method 600 may be executed locally, e.g., in the sensor device 500 or in a device communicatively connected to the sensor device using a short-range network, such as ZigBee or Wi-Fi. Running the method 600 locally may be beneficial in cases where, e.g., image data used for the sensor data includes privacy sensitive information.

Figure 7:
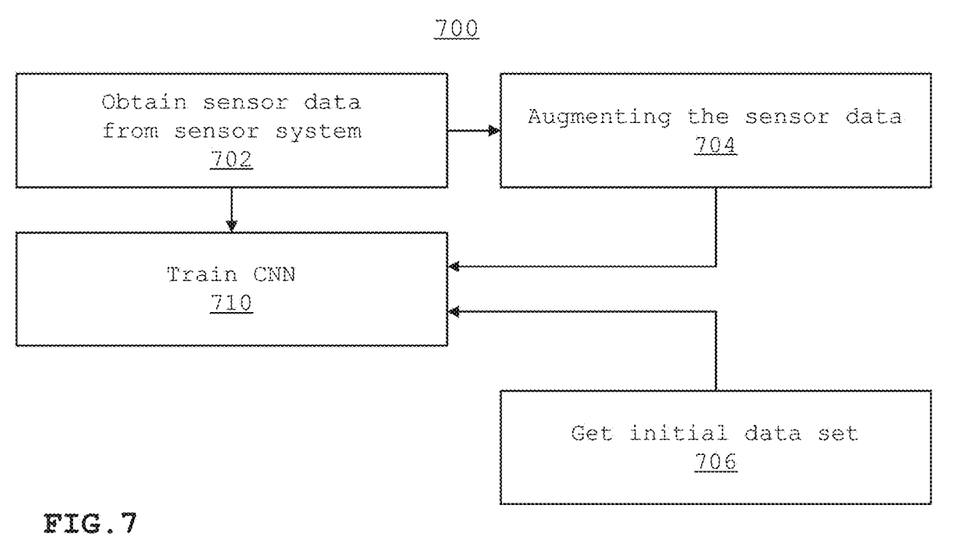
FIG. 7 is a flowchart of another example method for fine-tuning a CNN of a sensor system according to some embodiments of the present disclosure.

FIG. 7 is a flow diagram of another example method 700 for fine-tuning a CNN of a sensor system, e.g., CNN 504 of sensor system 500, according to some embodiments. In step 702 sensor data may be obtained from the sensor system, e.g., from a sensor device 502.

In step 704 sensor data may be augmented to create further sensor data and make the fine-tuning process more robust. Hereto, a copy of obtained sensor data from step 702 may be image processed to, e.g., simulate different lighting conditions. In another example, in step 704 sensor data may be obtained from a sensor device, e.g., sensor device 502, using different sensor setting, e.g., by changing a sensor gain. Augmenting may be performed pseudo-randomly, e.g., using randomly chosen lighting conditions or randomly chosen sensor gains. The sensor data and the augmented sensor data may be used to provide the sensor data for training the CNN.

In step 706 an initial data set is obtained, which may be used to provide the initial data set for training the CNN. In step 710 the sensor data and the initial data set are used to train the CNN. The fine-tuning results in parameters that are fine-tuned to the deployment location of the sensor system, typically in the form of updated weights and/or biases of the CNN.

Figure 8:
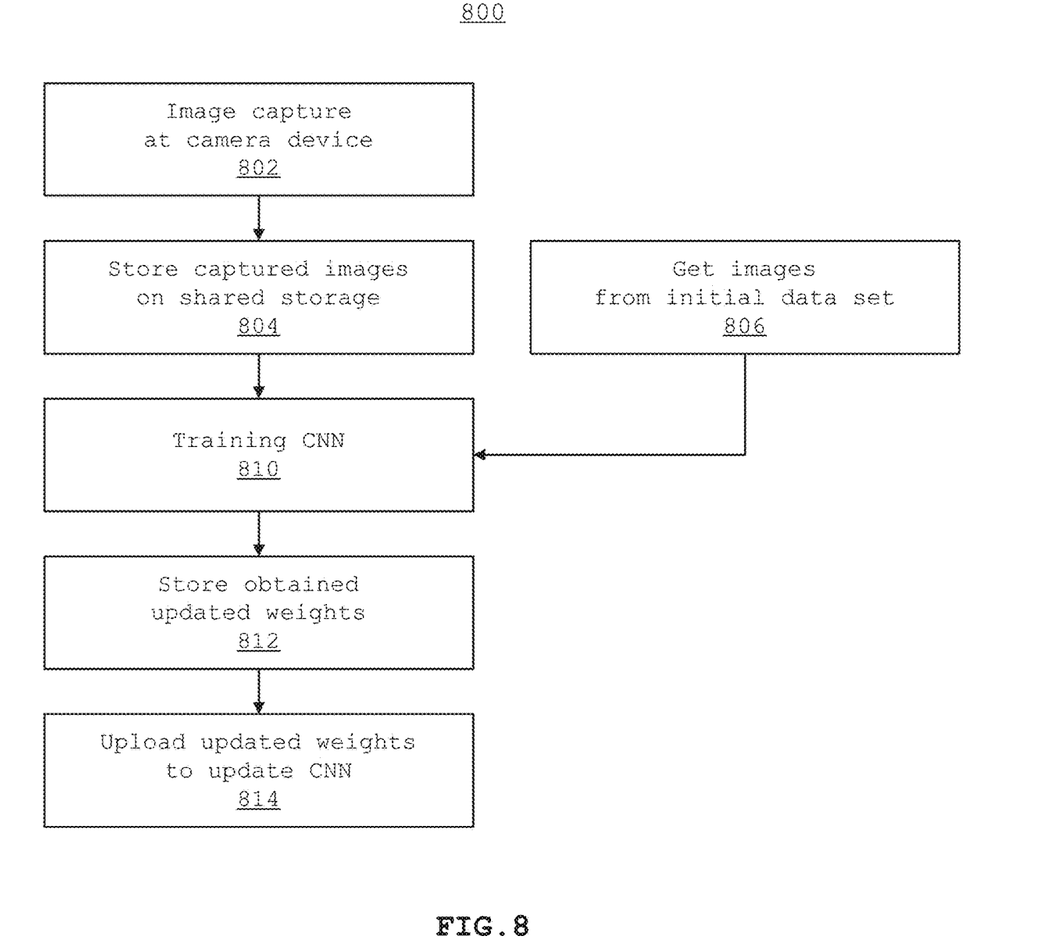
FIG. 8 is a flowchart of another example method for fine-tuning a CNN of a sensor system according to some embodiments of the present disclosure.

FIG. 8 is a flow diagram of another example method 800 for fine-tuning a CNN of a sensor system, e.g., CNN 504 of sensor system 500, according to some embodiments. In step 802 sensor data may be obtained from the sensor system, e.g., from a sensor device 502. This sensor data may be used to provide the sensor data for fine-tuning the CNN.

The sensor data obtained in step 802 may be stored on a shared storage in step 804. The shared storage may be shared between the computer systems involved in method 800, e.g., sensor system 500 and a remote system 520. The shared storage may be part of remote system 520. An example of a shared storage is a folder on a hard drive of a computer remote to the sensor system. In another example, the shared storage may be located on a laptop computer that is communicatively connected to the sensor system, e.g., via a Wi-Fi, Bluetooth™ or local-area network (LAN) connection. In another example, the shared storage may be located on a memory stick, e.g., a USB drive, that may be connected to the sensor system.

In step 806 an initial data set is obtained, which may be used to provide the initial data set for fine-tuning the CNN. The initial data set may be stored, possibly pre-stored, on the shared storage or obtained from another data source, e.g., via a LAN or wide-area network (WAN) connection.

In step 810 the sensor data and the initial data set are used to train the CNN. Training may be performed on the remote system 520, e.g., on the laptop computer, or another computer that has access to the sensor data and the initial data set. If the shared storage is located on a memory stick, the memory stick may be removed from the sensor system when the sensor data has been stored on the memory stick and inserted in the remote system 520 to make the sensor data available to the remote system 520. The training runs the CNN on one or more processors, e.g., one or more central processing units (CPUs), preferably one or more graphics processing units (GPUs) for better processing performance.

The fine-tuning results in parameters that are fine-tuned to the deployment location of the sensor system, typically in the form of updated weights and/or biases of the CNN. The obtained parameters may be stored on the shared storage in step 812. Alternatively, the updated weights may be stored, possibly temporarily, on another storage device in the remote system 520.

The model of the CNN of the sensor system, e.g., CNN 504, is typically identical to the model of the CNN used for training. The training may be used to fine-tune parameters of the CNN, without changing the model of the CNN. In some embodiments, training involves only a few layers of the CNN, e.g., by fixing the weights of the initial layers and modify only a few layers.

The updated parameters may be uploaded to the sensor system, e.g., to the storage device 506, in step 814. Hereto, the shared storage may be communicatively connected to the sensor system, e.g., via the remote system 520 and a communication link between the remote system 520 and the sensor system 500. In another example, the parameters may be uploaded by connecting the memory stick to the sensor system and transfer the parameters from the memory stick to the storage device 506.

Example Data Processing System

Figure 9:
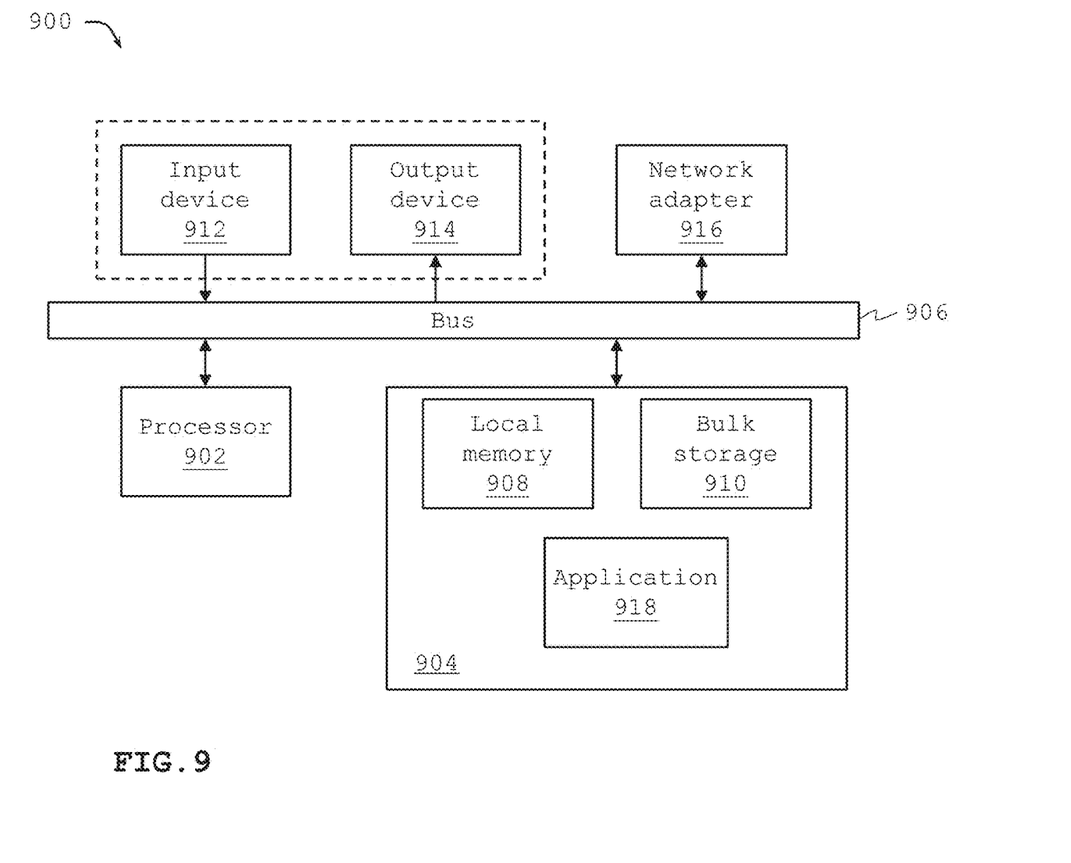
FIG. 9 provides a block diagram illustrating an example data processing system that may be configured to implement, or control, at least portions of operating a sensor system, according to some embodiments of the present disclosure.

FIG. 9 provides a block diagram illustrating an example data processing system 900 that may be configured to control operation of one or more sensor system or one or more remote systems as described herein, according to some embodiments of the present disclosure. For example, the data processing system 900 may be configured to implement or control portions of operating one or more sensor system 500 as described with reference to FIG. 5. In some embodiments, the data processing system 900 may be configured to implement at least portions of the remote system 520, shown in FIG. 5.

As shown in FIG. 9, the data processing system 900 may include at least one processor 902, e.g., a hardware processor 902, coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within this disclosure. For example, the processor 902 may be configured to implement or control the processing device 508.

In some embodiments, the processor 902 can execute software or an algorithm to perform the activities as discussed in the present disclosure, in particular activities related to configuring and/or operating one or more sensor systems as described herein. For example, the processor 902 may be configured to execute the CNN 504. The processor 902 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 902 may be communicatively coupled to the memory element 904, for example in a direct-memory access (DMA) configuration, so that the processor 902 may read from or write to the memory elements 904.

In general, the memory elements 904 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 900 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., the sensor system 500 or remote system 520 as shown in FIG. 5, can also include suitable interfaces for receiving, transmitting, and/or otherwise communicating data or information in a network environment so that they can communicate with, e.g., the data processing system 900.

In certain example implementations, mechanisms operating sensor systems as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as the storage device 506 shown in FIG. 5, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as the processor 902 shown in FIG. 9, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 904 may include one or more physical memory devices such as, for example, local memory 908 and one or more bulk storage devices 910. For example, the memory element 904 may be configured to implement or control storage device 506. The local memory may refer to RAM or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the number of times program code must be retrieved from the bulk storage device 910 during execution.

As shown in FIG. 9, the memory elements 904 may store an application 918. In various embodiments, the application 918 may be stored in the local memory 908, the one or more bulk storage devices 910, or apart from the local memory and the bulk storage devices. It should be appreciated that the data processing system 900 may further execute an operating system (not shown in FIG. 9) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

Input/output (I/O) devices depicted as an input device 912 and an output device 914, optionally, can be coupled to the data processing system. Examples of input devices may include, but are not limited to, a keyboard, a pointing device such as a mouse, or the like. Another example of an input device is the sensor device 502 shown in FIG. 5. Examples of output devices may include, but are not limited to, a monitor or a display, speakers, or the like. In some embodiments, the output device 914 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 914. Input and/or output devices 912, 914 may be coupled to the data processing system either directly or through intervening I/O controllers.

In an embodiment, the input and the output devices may be implemented as a combined input/output device (illustrated in FIG. 9 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as a stylus or a finger of a user, on or near the touch screen display.

A network adapter 916 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

Select Examples

The following paragraphs provide various examples of the embodiments disclosed herein.

Example 1 provides a sensor system. The sensor system may include a sensor device configured to capture sensor data. The sensor system may further include a storage device configured to store the captured sensor data. The sensor system may further include one or more processing devices. The sensor system may further include a CNN, e.g., CNN 504, configured to, when executed by one or more of the processing devices, detect objects in the captured sensor data. An example of a processing device for executing the CNN is processing device 508 as shown in FIG. 5. One or more of the processing devices may be configured to fine-tune the CNN using at least a part of the captured sensor data and an initial data set as input to the CNN. An example of a processing device for fine-tuning the CNN is processing device 508 as shown in FIG. 5. Another example of a processing device for fine-tuning the CNN is remote system 520 as shown in FIG. 5. The initial data set may be common to a plurality of CNNs of different sensor devices. The captured sensor data may be specific to a subset of the plurality of CNNs. In an example, the sensor data may be captured at a deployment location of the sensor system.

Example 2 provides the sensor system according to claim 1, wherein the subset of the plurality of CNNs only comprises the CNN of the sensor system.

Example 3 provides the sensor system according to claim 1 or 2, wherein the CNN is initially trained using the initial data set. The processing device may be configured to fine-tune the initially trained CNN using the at least part of the captured sensor data and a subset of the initial data set.

Example 4 provides the sensor system according to any one of the claims 1-3, wherein the processing device is configured to fine-tune the CNN by updating one or more parameters of a last layer of feature extraction or any higher layer from the feature extraction of the CNN, the one or more parameters preferably including weights and/or biases.

Example 5 provides the sensor system according to any one of the claims 1-5, wherein the processing device is configured to fine-tune the CNN by inputting the at least part of the captured sensor data and the initial data set to a copy of the CNN to obtain one or more updated parameters of the CNN, the one or more parameters preferably including weights and/or biases.

Example 6 provides the sensor system according to any one of the claims 1-6, wherein the sensor system is configured to distinguish persons from other objects using the CNN.

Example 7 provides the sensor system according to any one of the claims 1-6, wherein the sensor device, the CNN, the storage device and the processing device are locally communicatively connected, e.g., via a data bus, a Wi-Fi, Bluetooth™ or LAN connection.

Example 8 provides the sensor system according to any one of the claims 1-7, wherein at least one of the storage devices and the processing device are located in a server or cloud system that is communicatively connected to the sensor device.

Example 9 provides the sensor system according to any one of the claims 1-8, wherein the initial data set is obtainable from a server or cloud system that is communicatively connected to the sensor system.

Example 10 provides the sensor system according to any one of the claims 1-9, wherein the sensor device comprises a camera device.

Example 11 provides the sensor system according to any one of the claims 1-10, wherein image data is obtainable from the captured sensor data, and wherein the processing device is configured to fine-tune the CNN using at least a part of the image data.

Example 12 provides a sensor device configured to capture sensor data. The sensor device may be communicatively connected to a CNN configured to detect objects in the captured sensor data. The sensor device may be configured to transmit the captured sensor data to a processing device. The sensor device may be configured to receive updated parameters for the CNN from the processing device. The updated parameters may be based on fine-tuning the CNN using at least a part of the captured sensor data. The sensor device may include a transmitter, configured to transmit the captured sensor data to a processing device. The sensor device may include a receiver, configured to receive updated parameters for the CNN from the processing device.

Example 13 provides the sensor device according to claim 12, wherein the CNN is stored in a memory of the sensor device. The sensor device may include one or more processors for running the CNN.

Example 14 provides the sensor device according to claim 12 or 13, wherein the CNN is initially trained using an initial data set that is common to a plurality of CNNs of different sensor devices. The updated parameters may be based on fine-tuning the CNN using a subset of the initial data set and the at least part of the captured sensor data that is specific to the CNN of the sensor device.

Example 15 provides the sensor device according to any one of the claims 12-14, wherein the sensor device includes a camera device. The captures sensor data may include video data from which image data may be extractable and/or image data.

Example 16 provides a method for fine-tuning a CNN of a sensor system. The method may include obtaining sensor data from the sensor system. The method may further include training the CNN using at least a part of the sensor data and an initial data set as input to the CNN. The initial data set may be common to a plurality of CNNs of different sensor systems. The captured sensor data may be specific to a subset of the plurality of CNNs.

Example 17 provides the method according to claim 16, wherein the training is performed on a copy of the CNN. Updated parameters may be obtained from the training. The CNN may be fine-tuned using the updated parameters.

Example 18 provides the method according to claim 16 or 17, wherein the updated parameters include one or more updated weights and/or biases of one or more hidden layers of the CNN.

Example 19 provides the method according to any one of the claims 16-18, further including augmenting the sensor data. The sensor data may be augmented by generating further sensor data from the sensor data by filtering the sensor data to simulate different environmental conditions. Alternatively, or additionally, the sensor data may be augmented by capturing further sensor data from the sensor system using different sensor settings, such as different gains. The training may use at least a part of the further sensor data.

Example 20 provides the method according to any one of the claims 16-19, further including determining that unrecognizable objects are present in the sensor data. The training may be performed if unrecognizable objects are determined to be present in the sensor data. This allow the fine-tuning to be performed, possibly after an earlier fine-tuning, after establishing that false positives were detected by the sensor system.

Other Implementation Notes, Variations, and Applications

Sensor data may include various forms of data. An example sensor device 502 includes an image sensor to capture video data, e.g., in the form of AVI or MP4. Video data may be used to fine-tune the CNN, possibly after extracting one or more still images from the video data. In another example an image sensor may capture image data, e.g., in the form of raw image data, JPG or PNG. The image sensor may be configured to capture infrared images. In another example, the sensor device 502 may include a sound sensor to capture sound data, e.g., in the form of WAV of MP3.

The initial data set used for fine-tuning the CNN, such as CNN 504, may be obtained from sensor devices, such as sensor device 502, at different deployment locations. The sensor data may be obtained from a sensor device, such as sensor device 502, at the deployment location for which the CNN is to be fine-tuned. In an example, around 4300 images obtained from different deployment locations form the initial data set and around 2000 images form the sensor data that may be used to fine-tune the CNN. In another example, the number of images in the initial data set is about two to three times the number of images in the sensor data. The fine-tuning is not limited to these examples; different amounts of images in the initial data set and images in the sensor data may be used. Instead of images, any other sensor data may be used.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It is also imperative to note that all of the specifications, dimensions, and relationships outlined herein (e.g., the number of modules/systems, logic operations, etc.) have only been offered for purposes of example and teaching only. Such information may be varied considerably without departing from the spirit of the present disclosure, or the scope of the appended claims. The specifications apply only to some non-limiting examples and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the drawings may be combined in various possible configurations, all of which are clearly within the broad scope of the present disclosure.

Note that in the present description, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the present disclosure, to limit this disclosure in any way that is not otherwise reflected in the appended claims.

The invention claimed is:

1. A sensor system, comprising:
a sensor device configured to capture sensor data at a deployment location of the sensor system;
a storage device configured to store the captured sensor data and thither store an executable computer program implementing a convolutional neural network (CNN); and
one or more processing devices;
the CNN being configured to detect objects in the sensor data in response to at least one first processing device of the one or more processing devices executing the executable computer program, and
at least one second processing device of the one or more processing devices is configured to fine-tune the CNN using at least a part of the sensor data and an initial data set as input to the CNN,
wherein:
the initial data set is common to a plurality of CNNs of different sensor devices, and
the sensor data is specific to a subset of the plurality of CNNs.

2. The sensor system according to claim 1, wherein the subset of the plurality of CNNs only comprises the CNN of the sensor system.

3. The sensor system according to claim 1, wherein the CNN is initially trained using the initial data set to define an initially trained CNN, and wherein the at least one second processing device is configured to fine-tune the initially trained CNN using at least the part of the sensor data and a subset of the initial data set.

4. The sensor system according to claim 1, wherein the at least one second processing device is configured to fine-tune the CNN by updating one or more parameters of a last layer of feature extraction or any higher layer from the feature extraction of the CNN, the one or more parameters including one or more of weights and biases.

5. The sensor system according to claim 1, wherein the at least one second processing device is configured to fine-tune the CNN by inputting at least the part of the sensor data and the initial data set to a copy of the CNN to obtain one or more updated parameters of the CNN, the one or more updated parameters including one or more of weights and biases.

6. The sensor system according to claim 1, wherein the sensor system is configured to distinguish persons from other objects using the CNN.

7. The sensor system according to claim 1, wherein the storage device and the one or more processing devices are located in a server or cloud system that is communicatively connected to the sensor device.

8. The sensor system according to claim 1, wherein the sensor system is configured to obtain the initial data set from a server or cloud system that is communicatively connected to the sensor system.

9. The sensor system according to claim 1, wherein the sensor device comprises a camera device.

10. The sensor system according to claim 9, wherein the sensor data comprises image data, and wherein the at least one second processing device is configured to fine-tune the CNN using at least a part of the image data.

11. A sensor device comprising:
a transmitter configured to transmit sensor data to a processing device, wherein the sensor device is configured to capture the sensor data; and
a receiver configured to receive, from the processing device, updated parameters for a convolutional neural network (CNN) of the sensor device, the CNN being configured to detect objects in the sensor data, wherein the sensor device is communicatively connected to the CNN;

wherein the updated parameters are based on fine-tuning the CNN using a subset of an initial data set that is common to a plurality of different sensor devices and at least a part of the sensor data that is specific to the CNN.

12. The sensor device according to claim 11, wherein the CNN is stored in a memory of the sensor device, and wherein the sensor device comprises one or more processors for running the CNN.

13. The sensor device according to claim 11, wherein the CNN is initially trained using the initial data set.

14. The sensor device according to claim 11, wherein the sensor device comprises a camera device, and wherein the sensor data comprises video data, wherein image data is extractable from the video data and/or the video data comprises the image data.

15. A method, comprising:
obtaining sensor data from a sensor system; and
training, using at least a part of the sensor data and an initial data set, a convolutional neural network (CNN) of the sensor system,
wherein the initial data set is common to a plurality of CNNs of different sensor systems, and
wherein the sensor data is specific to a subset of the plurality of CNNs.

16. The method according to claim 15, wherein the training is performed on a copy of the CNN, wherein updated parameters are obtained from the training, and wherein the CNN is fine-tuned using the updated parameters.

17. The method according to claim 16, wherein the updated parameters include one or more updated weights and/or biases of one or more hidden layers of the CNN.

18. The method according to claim 15, further comprising augmenting the sensor data by at least one of:
generating further sensor data from the sensor data by filtering the sensor data to simulate different environmental conditions; or
capturing further sensor data from the sensor system using one or more of different sensor settings and different gains, and
wherein the training further uses at least a part of the further sensor data.

19. The method according to claim 15, further comprising determining that unrecognizable objects are present in the sensor data prior to performing the training; and
performing the training in response to determining that the unrecognizable objects are present in the sensor data.

20. The sensor system according to claim 1, line-tuning the CNN using at least the part of the sensor data and the initial data set as input to the CNN comprises modifying at least a subset of layers that constitute the CNN.

21. The sensor system according to claim 1, fine-tuning the CNN using at least the part of the sensor data and the initial data set as input to the CNN comprises modifying a first subset of layers that form the CNN and maintaining unchanged a second subset of layers that form the CNN.

* * * * *